Figure 1:
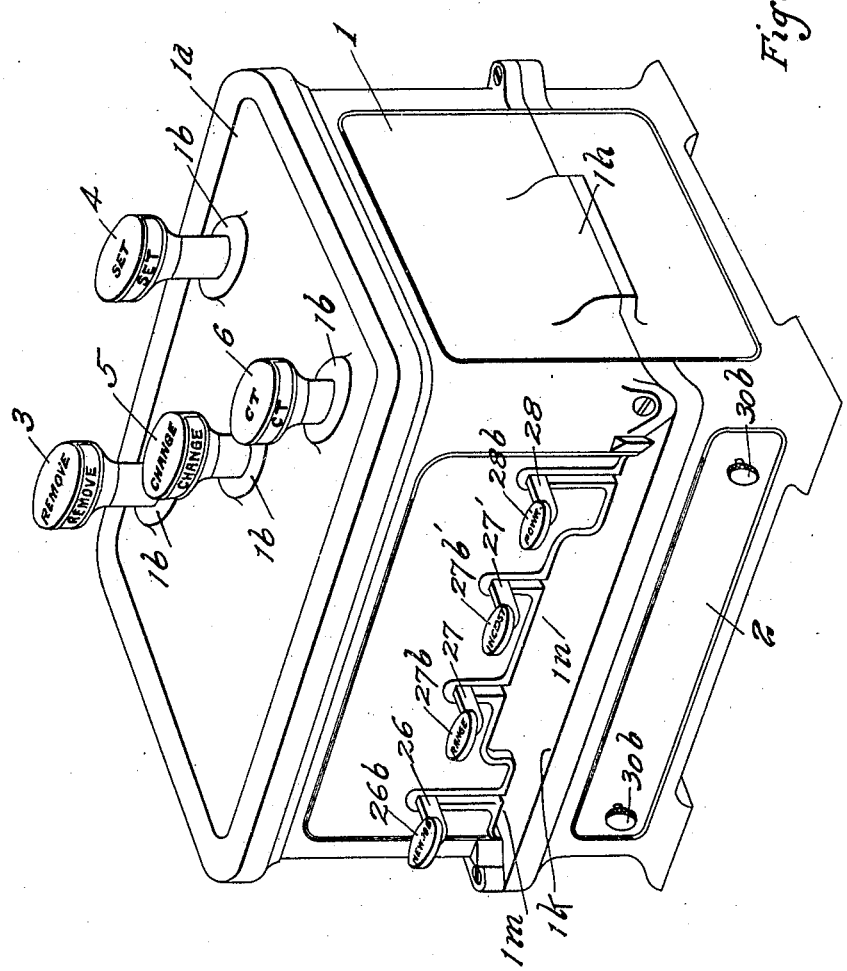

G. C. ANDERSON.
CARD CUTTER AND MARKER.
APPLICATION FILED SEPT. 23, 1907.

918,412.

Patented Apr. 13, 1909.
6 SHEETS—SHEET 1.

Witnesses,
Fordyce W. Brown.
W. L. Hale

Inventor
George C. Anderson.
by Atty. N. DuBois.

G. C. ANDERSON.
CARD CUTTER AND MARKER.
APPLICATION FILED SEPT. 23, 1907.

918,412.

Patented Apr. 13, 1909.
6 SHEETS—SHEET 4.

Witnesses,
Fordyce W. Brown.
W. K. Hale.

Inventor,
George C. Anderson.
by Atty. N. DuBois.

G. C. ANDERSON.
CARD CUTTER AND MARKER.
APPLICATION FILED SEPT. 23, 1907.

918,412.

Patented Apr. 13, 1909.
6 SHEETS—SHEET 6.

Fig. 7.

Witnesses,
Fordyce W. Brown.
W. K. Hale.

Inventor,
George C. Anderson.
by Atty. N. DuBois.

UNITED STATES PATENT OFFICE.

GEORGE C. ANDERSON, OF SPRINGFIELD, ILLINOIS, ASSIGNOR OF ONE-FOURTH TO WILLIAM N. SUTTON, OF SPRINGFIELD, ILLINOIS.

CARD CUTTER AND MARKER.

No. 918,412.      Specification of Letters Patent.      Patented April 13, 1909.

Application filed September 23, 1907. Serial No. 394,193.

*To all whom it may concern:*

Be it known that I, GEORGE C. ANDERSON, a citizen of the United States, residing at Springfield, in the county of Sangamon and State of Illinois, have invented a new and useful Card Cutter and Marker, of which the following is such a full, clear, and exact description as will enable others skilled in the art to which it appertains to make and use my said invention.

This invention relates to means for cutting and marking the cards of card systems used for filing and preserving in an orderly and convenient manner, data relating to business of any kind, to which the system may be applicable; the configurations of the cards themselves serving to indicate various data; a card of one form indicating certain facts and a card of somewhat different form indicating different facts.

The purpose of this invention is to provide means adapted to cut cards to give them certain predetermined configurations according to the uses to which they are to be put and to mark said cards by printing or inscribing thereon words or marks canceling certain parts of the cards or otherwise indicating the uses to which the cards respectively are to be put, and serving to prevent the inadvertent use of any of the cards for purposes for which they are not intended.

With these ends in view my invention consists in the novel features of construction and combinations of parts shown in the annexed drawings, to which reference is hereby made and hereinafter particularly described and finally recited in the claims.

Similar reference numerals and characters designate like parts in the several views.

Figure 2:
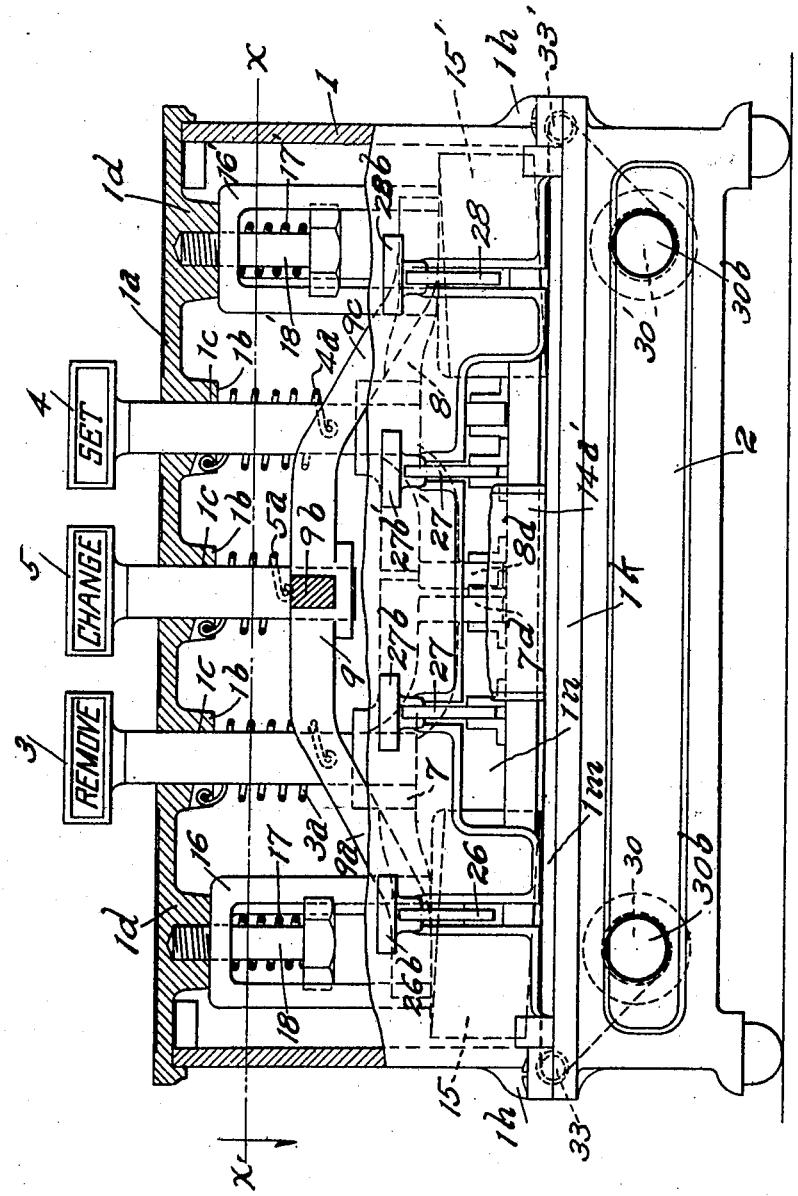
Figure 3:
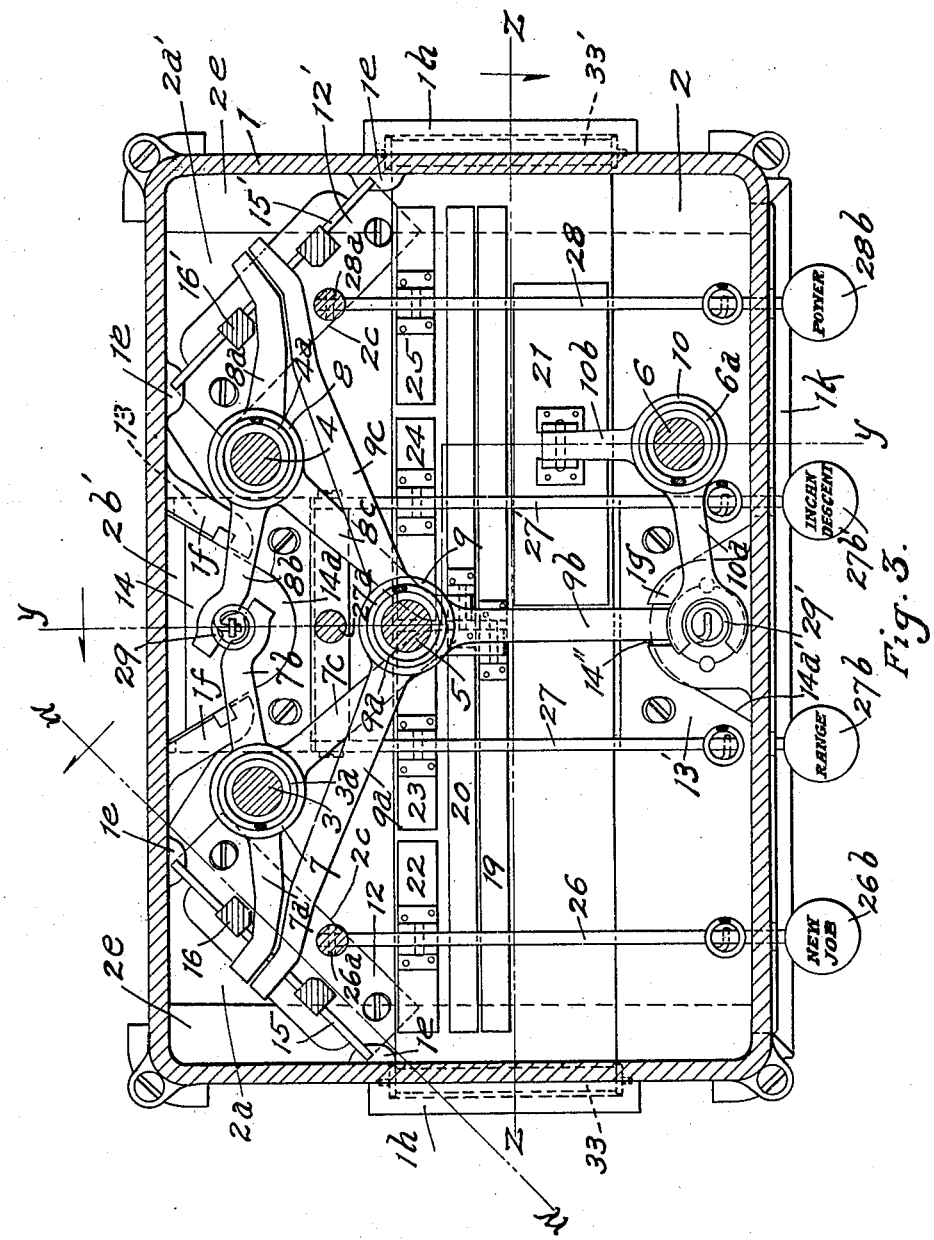
Figure 4:
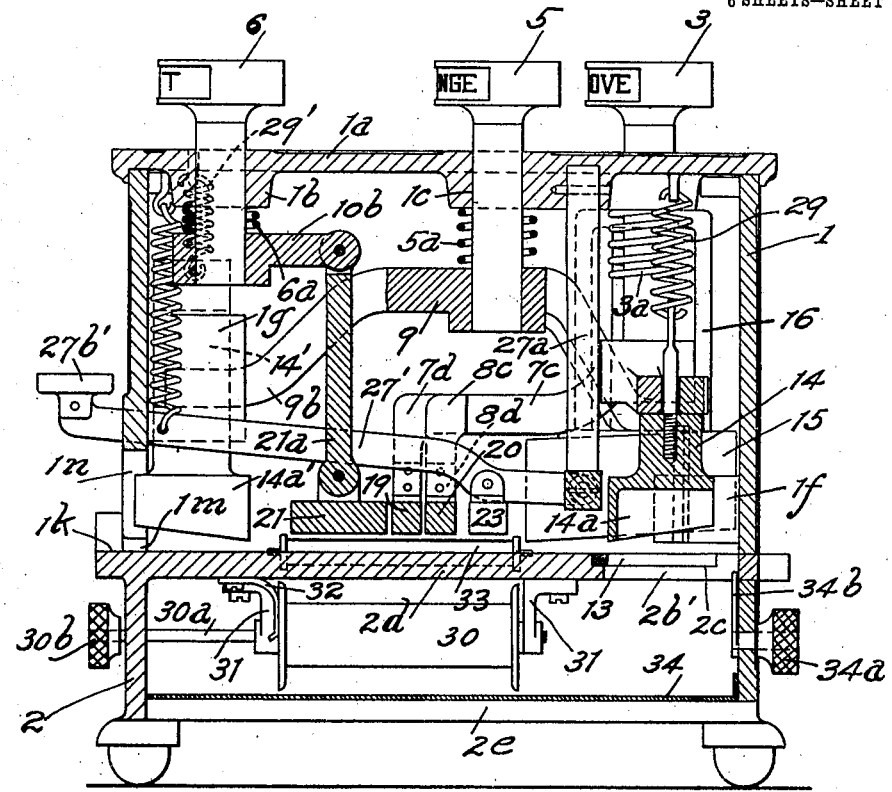
Figure 6:
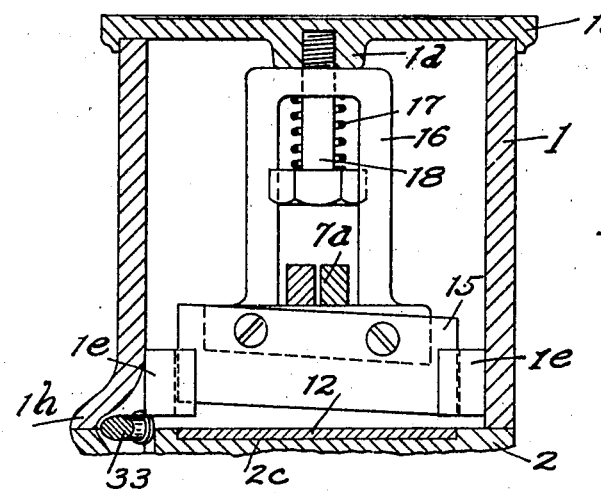
Figure 5:
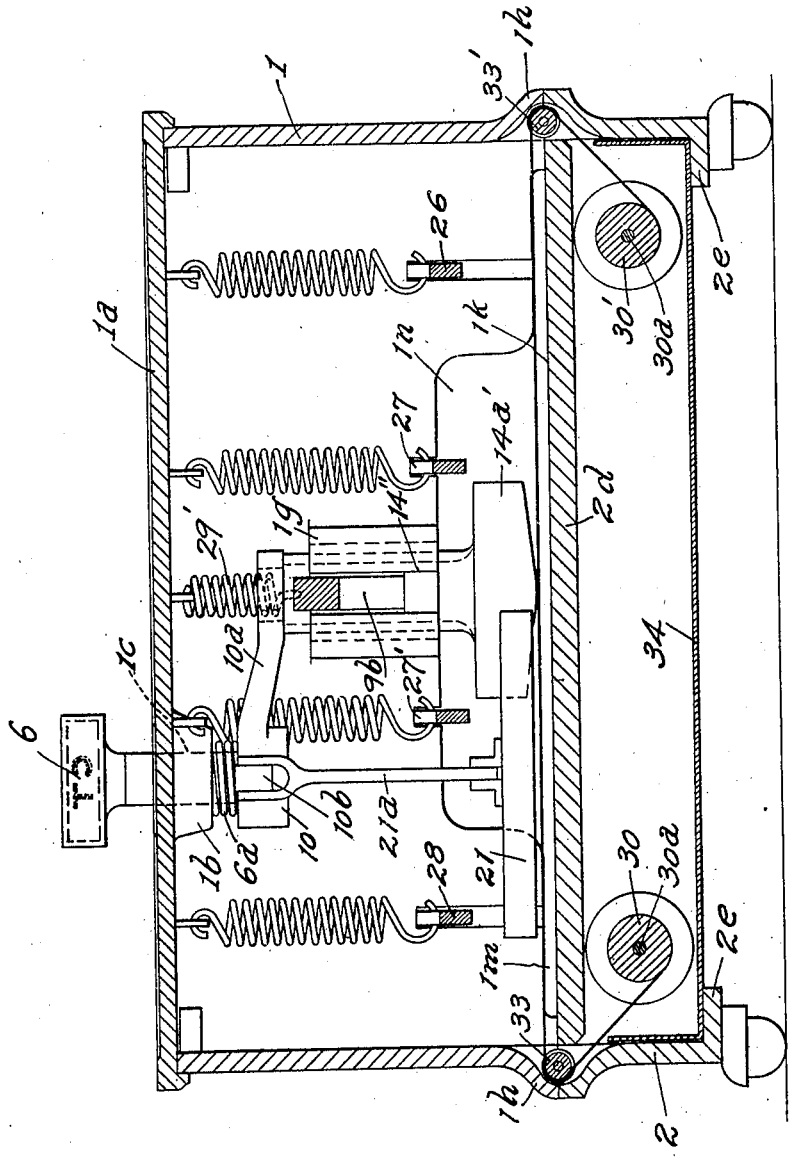

Figure 1 is an isometric projection of the complete machine; Fig. 2 is an enlarged combined front elevation and sectional view; Fig. 3 is a horizontal section on the line X. X. of Fig. 2; Fig. 4 is a vertical transverse section through the machine on the zig zag line Y. Y. of Fig. 3; Fig. 5 is a vertical longitudinal section through the machine on the line Z. Z. of Fig. 3; Fig. 6 is an oblique vertical section through the machine on the line W. W. of Fig. 3, and Fig. 7 is an enlarged plan of a card usable with the machine.

I have shown in the drawings and will hereinafter describe a machine especially adapted to cut cards to be used by a gas and electric light and power company; it is to be understood however, that this particular application of the machine is merely for convenience in illustrating and describing the same, and that the machine may, within the scope of my invention be adapted to cut and mark cards for use in many other different kinds of business.

This machine is designed to operate upon cards substantially such as are shown and described in my application for patent for card system, Serial Number 380,580, filed June 24, 1907. The cards are so constructed and arranged that parts of the cards are removable to the end that the change of the configuration of said cards by reason of the cutting off of one or more of said removable parts will give the cards configurations which will serve to indicate that cards of different configurations contain data or information of different kinds; said cards, after cutting, being of such form that when they are placed indiscriminately in even piles, a glance at the piles will disclose any disorder or irregularity in the arrangement of the cards in the piles respectively, and all inverted or misplaced cards in any pile may be simultaneously withdrawn, and then properly placed, without disturbing the arrangement of the other cards of the pile; and all the cards of one form may be simultaneously separated from the cards of the other form or forms; and when duplicate cards are used all the duplicate cards may be simultaneously separated from the original cards.

The material elements of the mechanism are; movable corner blades adapted to cut off the corners of cards; front-notching-blades between said corner blades and adapted to cut notches in the front edges of cards; rear notching-blades adapted to cut notches in the rear edges of cards; and type bars adapted to print pre-determined matter upon the cards, differing according to the character of the business.

The operating parts are contained within a suitable cabinet 1, preferably of cast iron; the cabinet is supported upon a suitable base 2 and has a detachable top $1^a$. Plungers 3, 4, 5 and 6 bearing different designations according to the character of the business, are slidable in holes $1^c$ through bosses $1^b$ which are preferably integral with the top $1^a$. Three-member spiders 7, 8 and 9 are suitably secured on the plungers 3, 4 and 5 respectively. A two-member spider 10 is secured on the plunger 6. Openings $2^a$, $2^{a\prime}$, $2^b$ and $2^{b\prime}$ extend through the platen $2^b$ of the base 2 and permit free passage of the clippings from the cards. Horizontal plates 12 and 12' having straight edges are flush with the top of the platen, are secured in suitable depressions $2^c$ in the platen and plates 13 and 13' having curved edges are in like manner secured on the platen. Straight blades 15 and 15' are secured on yokes 16 and 16' respectively. The yokes 16 and 16' are supported on springs 17 and 17'; which in turn are supported on vertical bolts 18 and 18' screwing into bosses $1^b$ on the under side of the top $1^a$. When the yokes are pressed downward the springs are compressed and upon removal of the pressure on the yokes the springs act to raise the yokes. Springs $3^a$, $4^a$, $5^a$ and $6^a$ surround the plungers 3, 4, 5, and 6 respectively. One end of each spring is connected to the corresponding plunger and the other end is connected with the corresponding boss $1^b$, in such manner that the depressing of the plunger will stretch the spring and the spring will act to raise the plunger. The blades 15 and 15' slide in suitable guides $1^e$ on the inside of the cabinet and cut vertically against the edges of the plates 12 and 12' respectively. The lower edges of the blades 15 and 15' are inclined as shown, in order that the blades may cut progressively along the edges of the plates 12 and 12', instead of cutting simultaneously along the whole length of the edges of said plates. A block 14 is slidable in guides $1^f$ on the inner wall of the cabinet and is provided with a curved blade $14^a$ fitting in the opening of the plate 13. A somewhat similar block 14' is slidable in guides $1^g$ and has at its lower end a blade $14^{a\prime}$ matching the opening in the plate 13'. The block 14' has a longitudinal channel 14" accomodating the member $9^b$ of the spider 9 as hereinafter explained. The spider 7 has members $7^a$, $7^b$ and $7^c$ respectively acting on the yoke 16, the block 14, and the type bar 19. The spider 8 has members $8^a$, $8^b$ and $8^c$ respectively acting on the yoke 16', the block 14 and the type bar 20. The spider 9 has members $9^a$, $9^b$ and $9^c$ acting on the yoke 16, the yoke 16' and the block 14' respectively. The spider 10 has members $10^a$ and $10^b$, acting on the block 14' and the type plate 21 respectively.

Levers 26 and 28 are respectively supported on downwardly extending rods $26^a$ and $28^a$, secured on the under side of the top $1^a$, and levers 27 and 27' are supported on a downwardly extending rod $27^a$ secured on the under side of the top $1^a$. The levers are provided with keys $26^b$, $27^b$, $27^{b\prime}$ and $28^b$ bearing suitable designations.

In the drawings the plungers 3, 4, 5 and 6 and the keys $26^b$, $27^b$, $27^{b\prime}$ and $28^b$ are respectively inscribed "Remove," "Set," "Change," "C. T.," "New Job," "Range," "Incandescent" and "Power;" indicating that the plunger marked "Set" is to be operated to cause the proper cutting and marking of a card relating to the setting of a meter; the plunger marked "Change" is to be operated to cause the cutting and marking of a card relating to any change effecting a previously installed meter; the plunger marked "Remove" is to be operated to cause the cutting and marking of a card relating to the removal of a meter; the plunger marked "C. T." is to be used to cause the cutting and marking of a card supplying data relative to the change of tenants of the building where the meter is located; the key marked "New Job" is to be used in operating the proper type bar to print on the card the inscription "New Job;" the key marked "Range" is to be operated to cause the printing upon the card, of matter relating to the connecting or disconnecting of a range; the key marked "Incandescent" is to be operated to cause the printing on the card of matter relating to incandescent service; and the key marked "Power" is to be operated to cause the printing upon the card of matter relating to power to be supplied, or discontinued, as the case may be.

Short type bars 22, 23, 24 and 25 have a pivotal connection with the levers 26, 27, 27' and 28 respectively. The type bars have on their under side raised letters or characters adapted to strike an underlying type ribbon, to print on the card the matter or the characters which are in relief on the type bars. The long type bar 19 is connected to oscillate slightly on the downwardly extending part $7^d$, of the member $7^c$, of the spider 7, and the long type bar 20 is similarly connected with the downwardly extending part $8^d$, of the member $8^c$, of the spider 8. The purpose of this slight oscillation of the type bars is to enable them to readily adapt themselves to the surface of the card lying on the platen. The type plate 21 is supported on and pivotally connected with a rod $21^a$ which is pivotally connected with the member $10^b$ of the spider 10. Coiled springs 29 and 29' respectively connect the blocks 14 and 14' with the underside of the top $1^a$. When the blocks are depressed the springs are stretched, and upon removal of the pressure on the blocks the springs act to raise the blocks. Spools 30 and 30' are mounted on brackets 31 and carry a typewriter ribbon such as is in common use. Shafts $30^a$ provided with suitable handles $30^b$ serve to turn the spools to wind or unwind the ribbon, as may be desired. Springs 32 bear against the ends of the spools 30, to prevent accidental turning of the spools and sagging of the ribbon. The ribbon passes around rollers 33 and 33' turning in housings $1^h$ in the shell 1. The ribbon supported on the rollers 33 and 33' extends lengthwise of the machine and is situated between the upper surface of the platen and the lower surface of the type bars 19, 20, 22, 23, 24 and 25 and the type plate 21.

On the front of the shell 1 is a longitudinal shelf 1$^k$, a longitudinal slot 1$^m$, and a longitudinal opening 1$^n$. The slot 1$^m$ facilitates the insertion of the cards into the machine; the shelf 1$^k$ guides the cards into the slot; and the opening 1$^n$ admits the fingers of the user for convenience in inserting or withdrawing the cards. A drawer 34 slides on ledges 2$^e$ within the base 2 and is provided with a knob 34$^a$ for pulling the drawer and a latch 34$^b$ for securing the drawer in place.

The spiders 7, 8 and 9 are so constructed and are so connected with the type bars that if the plunger 3 be depressed it will cause the blades 14$^a$ and 15, and the type bar 19 to operate; if the plunger 4 be depressed it will cause the blades 14$^a$ and 15′ and the type bar 20 to operate; if the plunger 5 be depressed it will cause the blades 15, 15′ and 14$^{a'}$ to operate; and if the plunger 6 be depressed it will cause the blade 14$^{a'}$ and the type plate 21 to operate.

A card of the preferable form usable with the machine is shown in Fig. 7 and will now be described. At the upper left-hand corner of the card is inscribed the word "Set;" at the upper right-hand corner is inscribed the word "Remove;" in the upper central part of the card is inscribed the word "Change;" and in the lower central part of the card is the inscription "C. T." signifying change of tenant; or this part may be without any inscription.

In practice the detachable part of a card bearing the proper designation to indicate the character of the work described on any card will ordinarily remain on the card, and some or all of the detachable parts bearing the other designations will be cut off. If the card contains instructions relative to the setting of a meter the parts containing the inscription "Change" and "Remove" will be cut off and the parts "Set" and "C. T." will remain on the card. If the card contains instructions relating to the changing of a meter the part inscribed "Change" will remain on the card and the parts inscribed "Set," "Remove" and "C. T." will be cut off. If the card contains instructions relative to the removal of a meter the parts bearing the inscriptions "Remove" and "C. T." will remain on the card and the parts "Set" and "Change" will be cut off. In case the card is to contain matter relating to a change of tenant the part marked "C. T." will be removed and the parts marked "Set," "Change," and "Remove," respectively, will remain upon the card.

The manner of assorting the cards is fully described in my said application #380580 and as the method of assorting the cards is not a part of the present invention it need not be described here.

Relative to the cards which after cutting, bear the inscription "C. T.," it will be observed that in cutting the cards to remove the part inscribed "C. T." the procedure is the reverse of that followed in cutting the parts marked "Set" and "Remove," that is to say; if it is desired to cut off the part of the card marked "Set" the plunger marked "Remove" will be used but if it is intended to cut off the part of the card marked "C. T." the plunger having the same designation ("C. T.") will be used. The reason for this is that matter relating to change of tenant is to be written on the back of the card, and the absence of the part "C. T." and the words "Change of Tenant, see other side," printed on the face of the card indicate to the user that he is to look on the back or reverse side of the card for that information. If the part "C. T." remains on the card the user is thereby apprised that the card relates exclusively to business stated on the face of the card and indicated by the designation, "Set," "Change" or "Remove" as the case may be.

The presence on the card of the designations "Set," "Change" or "Remove" as the case may be, indicates that the card relates to business of the kind designated; on the contrary the absence of the designation "C. T." indicates that the card relates to change of tenant or other business described on the back of the card. When "C. T." is cut out, "Change" remains; and the notation is made on the back of the card. In one case the presence of a part indicates the character of the card and in the other case the absence of a part indicates not only the character of the card, but also indicates that the information will be found on the back of the card.

On each of the cards are longitudinal spaces 19$^a$ and 20$^a$, corresponding in position to the type bars 19 and 20 respectively. The space 19$^a$ which will be directly under the type bar 19 when the card is in place on the platen is intended to contain written matter relating to the setting of meters; and the space 20$^a$ which is under the type bar 20 is intended to contain written matter relating to the removal of meters. If the card relates to the setting of a meter it is desirable to mutilate or mark off the space provided for written matter relating to the removal of a meter, to the end that the user may be prevented from inadvertently writing in the wrong space.

The cards herein shown and described may without material modification, be adapted for use in other businesses merely by changing the designations of the cards. For example, the cards may be used to keep track of mercantile transactions by replacing the descriptions "Set," "Change," "Remove"

and "C. T." with other designations, such as, "Charge" "Cash," "Credit" and "Exchange;" and the body of the cards may have a space corresponding to the designation "Charge," and another space corresponding to the designation "Credit;" and the marking devices may be so arranged that when the "Charge" space on the card is used the "Credit" space will be canceled and vice versa if the "Credit" space is used the "Charge" space will be canceled, so that the salesman would not be liable to make a wrong entry on the card.

In mercantile business the keys may be used to mark on the card the date, the store department and other data relating to the transaction. In case of exchange the type plate 21 may be arranged to mark upon the card the words "Exchange, see other side," or equivalent notation. The mechanism is therefore so arranged that when the plunger 3 is operated to cut off the corner of the card marked "Set" it will at the same time operate the type bar 19 to cancel the "Set" space on the card and in like manner when the plunger 4 is depressed to cut off the part marked "Remove" it will at the same time operate the type bar 20 to cancel the "RMV" space of the card.

It will be observed that the designations of the plungers 3 and 4 are opposite or contrary to the cards; that is to say the plunger 4 marked "Set" operates the blade 15' to cut off the "Remove" corner of the card and the plunger 3 marked "Remove" operates the blade 15 to cut off the "Set" corner of the card. The purpose of this inverse operation is to enable the operator to produce a card relating to the subjects designated by the plungers repectively and to avoid the necessity for him to keep in mind that in order to produce a "Set" card he must cut off the "Change" and "Remove" parts; and in order to produce a "Remove" card he must cut off the "Change" and "Set" parts; and in order to produce a "Change" card he must cut off the "Remove" and "Set" parts. If the card is intended to contain matter relating to a change of tenant that matter will preferably be inscribed on the back of the card, and in order that the user may be apprised of that fact the plunger 6 will be used to operate the type plate 21 to print on the card the words "Change of Tenant, see other side" or some equivalent inscription, warning the user that the desired information will be found on the back of the card.

In work of the class described it is necessary to discriminate between new work or old work. This is effected by means of the key 26ᵇ operating the lever 26 to cause the type bar 22 to print on the card the words "New Job" if the card relates to new business. In like manner if the card relates to a gas range the key 27ᵇ will be depressed to operate the type bar 23 to print the word "Range;" if the card relates to incandescent service the key 27ᵇ' will be depressed to operate the type bar 24 to print the word "Incandescent" and if the card relates to power, the key 28ᵇ will be depressed to operate the type bar 25 to print the word "Power."

In operating the machine, the parts which are clipped from the cards during the operation of the machine fall into the drawer 34 where they remain until such time as it may be convenient to remove the drawer and dispose of them.

Having fully described my invention what I claim as new and desire to secure by Letters Patent is:

1. In an apparatus for cutting and marking cards, the combination of means for supporting a card, corner cutter-devices adapted to cut off the corners of said card, an intermediate cutter-device adapted to cut a notch in the card intermediate of the removable corners thereof, a second cutter-device adapted to cut a second notch in said card, means operatively connecting said intermediate cutter-device with said corner cutter-devices respectively and means operatively connecting said second cutter-device with both of said corner cutter-devices.

2. In an apparatus for cutting cards, the combination of two corner blades; a front notching blade; a rear notching blade; means for simultaneously operating said front notching blade and one of said corner blades; means for simultaneously operating said front notching blade and the other corner blade; and means for simultaneously operating said rear notching blade and said first named corner blade.

3. In an apparatus for cutting cards, the combination of a rear notching blade; two corner blades; means for simultaneously operating said rear notching blade and said corner blades; and means for operating said rear notching blade independently of said corner blades.

In witness whereof I have hereunto subscribed my name at Springfield Illinois this 24th day of July 1907.

GEORGE C. ANDERSON.

Witnesses:
FORDYCE W. BROWN,
W. K. HALE.

It is hereby certified that in Letters Patent No. 918,412, granted April 13, 1909 upon the application of George C. Anderson, of Springfield, Illinois, for an improvement in "Card Cutters and Markers," errors appear in the printed specification requiring correction, as follows: On page 2, line 2, the reference-numeral "$2^b$" should read $2^d$, and same page, line 14, "$1^b$" should read $1^d$; and that the said Letters Patent should be read with these corrections therein that the same may conform to the record of the case in the Patent Office.

Signed and sealed this 4th day of May, A. D., 1909.

[SEAL.]
C. C. BILLINGS,
*Acting Commissioner of Patents.*